United States Patent [19]

Fujioka

[11] Patent Number: 4,733,952
[45] Date of Patent: Mar. 29, 1988

[54] SMALL ZOOM LENS

[75] Inventor: Yoshisato Fujioka, Higashikurume, Japan

[73] Assignee: Ricoh Company, Ltd., Tokyo, Japan

[21] Appl. No.: 843,684

[22] Filed: Mar. 25, 1986

[30] Foreign Application Priority Data

Mar. 27, 1985 [JP] Japan .................. 60-62968

[51] Int. Cl.$^4$ ........................................... G02B 15/177
[52] U.S. Cl. ...................................... 350/426; 350/427
[58] Field of Search ...................... 350/426, 427, 423

[56] References Cited

U.S. PATENT DOCUMENTS 4,465,343  8/1984  Horimoto ..................... 350/426 X
4,516,839  5/1985  Tokumaru ..................... 350/426
4,591,235  5/1986  Tokumaru et al. ............. 350/426 X Primary Examiner—John K. Corbin
Assistant Examiner—Scott J. Sugarman
Attorney, Agent, or Firm—Oblon, Fisher, Spivak, McClelland & Maier

[57] ABSTRACT

A zoom lens including a wide angle and having a zoom ratio of approximately two, in which a two-group zoom composed of a negative front group and a positive rear group is increased in a refracting power to make both the two-group zoom compact. With this, correction of aberrations is difficult to make, and therefore, the positive rear group is separated into two components so that in zooming, different moving amounts may be imparted to the respective components. The zoom lens according to the present invention is composed, from the front side, a first negative unit, a second positive unit and a third positive unit, whereby in zooming, the first unit lens is first moved toward an image along an optical axis and then toward an object, the second unit lens is moved toward the object, and the third unit lens is likewise moved toward the object so as to gradually widen a space between the third unit and the second unit.

2 Claims, 15 Drawing Figures

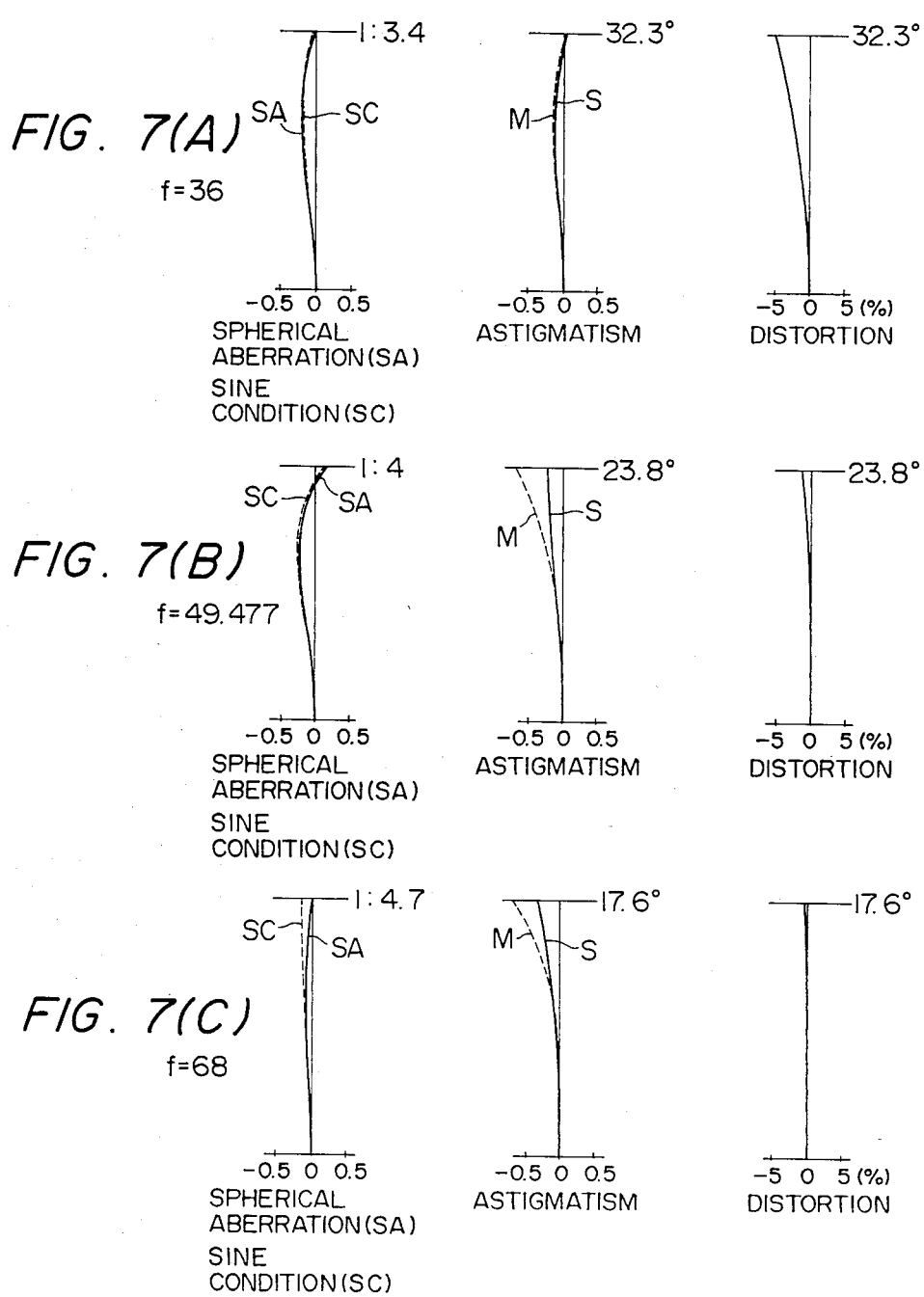

f=36 f=49.477 f=68

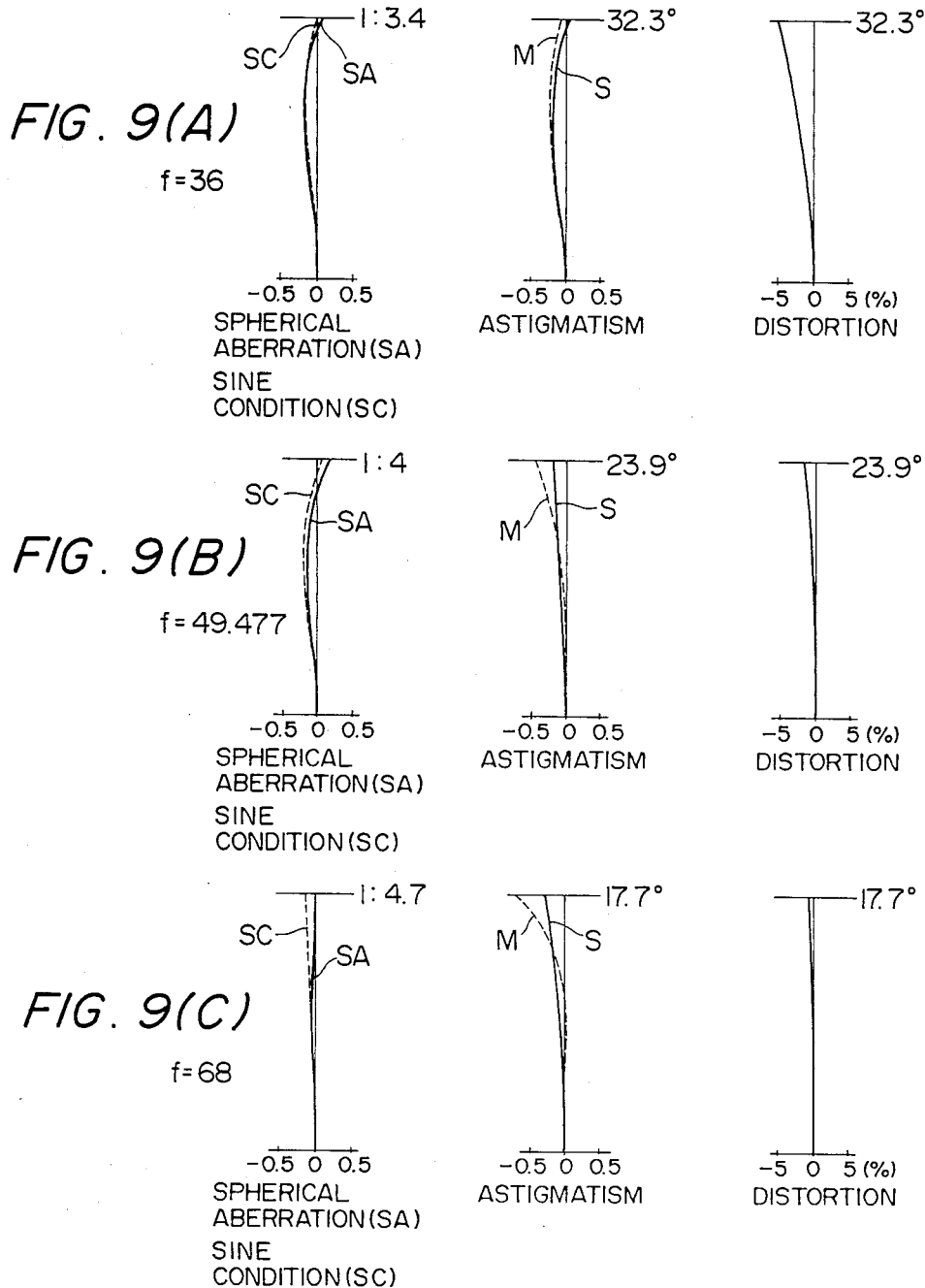

SMALL ZOOM LENS

BACKGROUND OF THE INVENTION

1. Field of the Invention

The present invention relates to a standard zoom lens in which a negative group is provided on the front side, which includes a wide angle and a medium-tele, which is small in size and which has excellent aberrations, and particularly, to a super-compact zoom lens.

2. Description of the Prior Art

A zoom lens including a wide angle and having a zoom ratio of about two is composed of a negative group provided on the front side and a positive group provided at the rear, and a two-group zoom for performing zooming by varying a space between the two groups is well known. This system has a drawback in that the overall length is extended since the construction thereof is based on the retrofocus type. In order to miniaturize the system as described above, one method is to increase the refracting power of the aforesaid front and rear groups.

However, the above-described method has a drawback in that both the front and rear groups are decreased in focal length, and a space between principal points of the front and rear groups is also proportionally small at the local length at which the front and rear groups are made close to each other, as a result of which the front group lens and the rear group lens come into contact, failing to provide for the longest focal length.

For example, Japanese Patent Application Laid-Open No. 111,013/83 discloses means to overcome the above-described problem, in which patent, the refracting power of both the front and rear groups is great, and means for extending the longest focal length comprises an arrangement wherein a fixed negative lens is arranged at the rear (image side) of the rear group.

In such a case, the refracting power of both the front and rear groups becomes great, entailing a difficulty in correction of aberrations.

SUMMARY OF THE INVENTION

It is therefore an object of the present invention to provide a zoom lens in which the aforesaid front group comprises a first unit having a negative refracting power, and the aforesaid rear unit is divided into a second group having a positive refracting power and a third unit having a positive refracting power, an increase in a refracting power resulting from miniaturization is diffused and relieved, and the second group and third unit are power-varied with different moving amount on an optical axis to thereby obtain excellent aberrations despite less number of lenses as well as super-small size.

In accordance with the present invention, there is provided a small zoom lens composed, in order from an object side, of a first unit having a negative refracting power, a second unit having a positive refracting power and a third unit having a positive refracting power, in which in zooming from a short focal length side to a long focal length side, said first unit is first moved toward an image on an optical axis, and halfway moved conversely toward the object to correct a variation in focal position, said second unit is moved toward the object on the optical axis to effect a variable power, and said third unit is moved toward the object with an amount different from that of the second unit to effect a variable power, the zoom lens being fulfilled with the following various conditions:

(1) $0.6 f_T < |f_1| < 0.85 f_T$
(2) $d_{2,3}w < d_{2,3}T$
(3) $bf_W < bf_T$
(4) $0.01 < f_2/f_3 < 0.2$ ($f_2 > 0$, $f_3 > 0$)
(5) $r_3.R > 0$ where, $f_1$: focal length of the first unit
$f_2$: focal length of the second unit
$f_3$: focal length of the third unit
$f_T$: composite focal length of the entire system in the longest focal length
$d_{2,3}w$: lens space between the second and third unit in the shortest focal length
$d_{2,3}T$: lens space between the second and third unit in the longest focal length
$bf_W$: backfocus of the entire system in the shortest focal length
$bf_T$: backfocus of the entire system in the longest focal length
$r_3.R$: radius of curvature of the spherical surface on the image side of the third group lens Condition (1) is concerned with the range of the focal length of the first unit to miniaturize the zoom lens and improve aberrations.

If the lower limit of the condition (1) is exceeded, it will be advantageous in miniaturization but is not favorable because the negative refracting power of the first unit is too intensive to deteriorate various aberrations including a spherical aberration. If the upper limit is exceeded, aberrations are well corrected but the miniaturization which is the end of the present invention cannot be achieved.

Conditions (2) and (3) are concerned with the moving amount of the second and third unit in connection with the variable power, and represent that in variable power from the short focal length side to the long focal length side, the third unit is moved toward the object in the amount of movement less than the amount of movement of the second unit toward the object on the optical axis.

In the two-group zoom lens with a negative group provided frontwardly, when a diaphragm is provided frontwardly of the positive rear group or in the intermediate, the incident pupil at the time of the long focal length is moved toward the object as compared with that at the time of the short focal length. This results from the fact that at the time of the long focal length, the positive rear group is moved toward the object. As the result, in the long focal length a large quantity of marginal rays enter, and correction of coma also becomes difficult to make. Particularly, in case of miniaturization as in the present invention, this entency increases. A fixed diaphragm may be mounted at the rear (image side) of the rear group to thereby prevent coma in the long focal length while giving rise to a drawback in which the marginal rays in the long focal length excessively decrease.

Conditions (2) and (3) of the present invention are applied where at the zooming, the third group having a positive refracting power is made to have an appropriate amount of movement in the range less than that of the second group to thereby make even the marginal rays in the whole zone from the short focal length to the long focal length thus obtaining a zoom lens which is small in size and excellent in coma.

The condition (2) is also effective to decrease a change in a distortion resulting from a variable power along with the condition (4).

Generally, in the short focal length, a negative distortion increases because a negative refracting power is positioned first and a positive refracting power positioned at the rear thereof. In the long focal length, a positive distortion increases because a positive refracting power is moved toward the object. On the other hand, in the present invention, the positive third unit is positioned at the rear of and away from the second unit as the former is displaced toward the long focal length side, and therefore, in the long focal length side, a positive distortion rarely occurs, and a distortion resulting from the variable power can be minimized in change.

Condition (4) is concerned with the distribution of a refracting power of the positive second unit and positive third units. Both second and third groups are of a small type despite less number of lenses and yet aberrations are well provided. When the lower limit of the condition (4) is exceeded, the third unit has less effective results and the burden of the refracting power of the second unit becomes excessively large. Therefore, the spherical aberration deteriorates and the flatness of an image also deteriorates. When the upper limit is exceeded, the burden of the refracting power of the third unit is large and therefore, the burden of the refracting power of the second unit is relieved to improve the spherical aberration as well as the flatness of an image whereas the refracting power of both the negative first group and positive second unit tends to be weakened, thus failing to achieve the miniaturization which comprises the object of the present invention.

Condition (5) is applied so that the third group is formed into a positive meniscus lens with its convex surface being faced to the object.

When the third unit is constituted in the range of the condition (4), even a single lens may sufficiently obtain excellent aberrations including a chromatic aberration. In this case, the third group is formed into a meniscus lens with its convex surface being faced to the object, thereby enabling to make excellent the coma in the marginal portion.

DESCRIPTION OF THE DRAWINGS

FIGS. 7(a–c), 8(a–c) and 9(a–c) are aberration curves of Embodiments 1, 2 and 3, respectively.

DETAILED DESCRIPTION OF THE PREFERRED EMBODIMENTS

Figure 1:
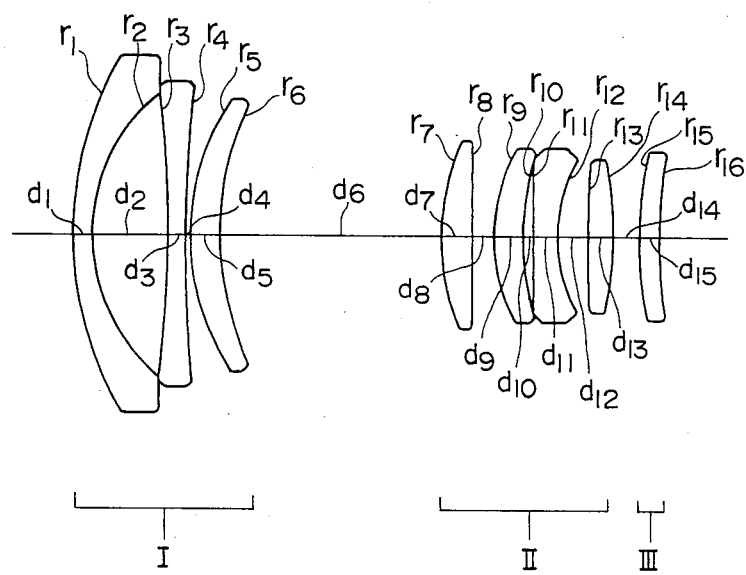
FIGS. 1, 3 and 5 are sectional views showing the constitution of Embodiments 1, 2 and 3, respectively, of a small zoom lens according to the present invention.
Figure 2:
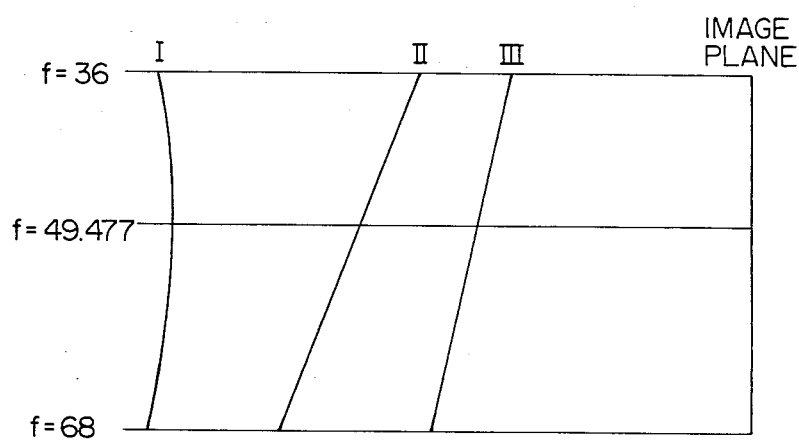
FIGS. 2, 4 and 6 are views showing relative movements of respective lens units in Embodiments 1, 2 and 3, respectively.
Figure 3:
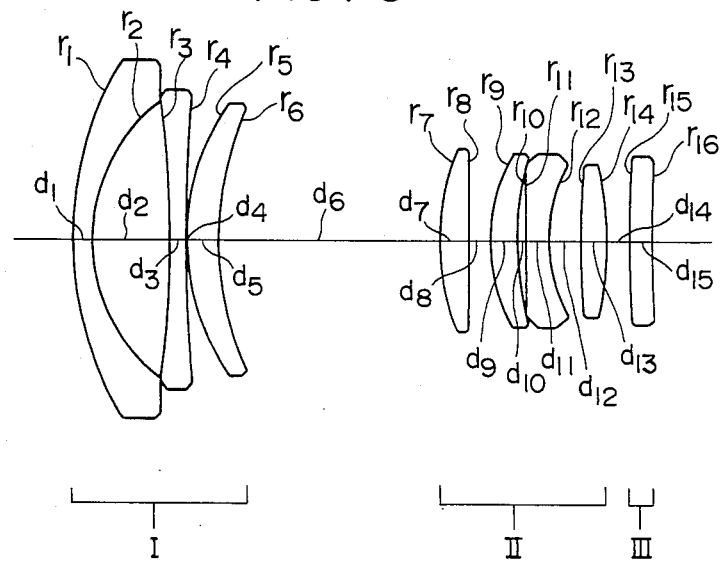
Figure 4:
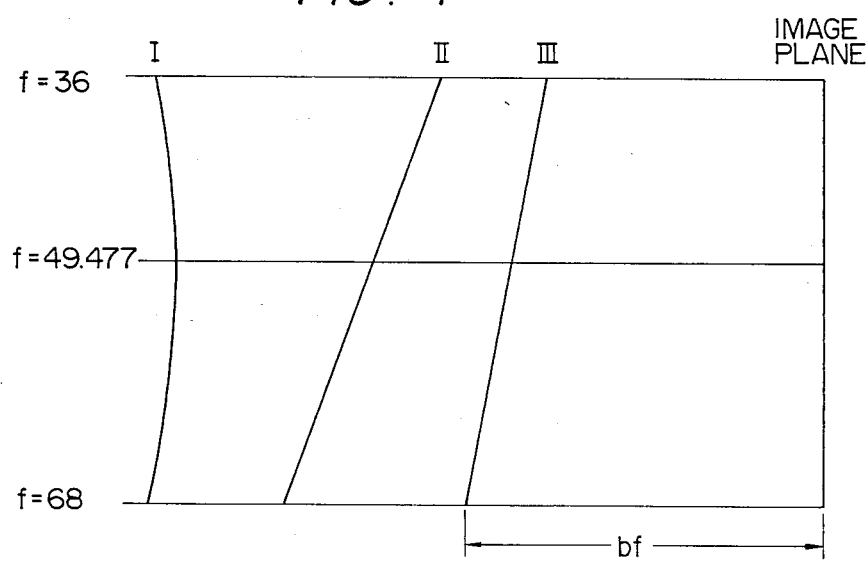
Figure 5:
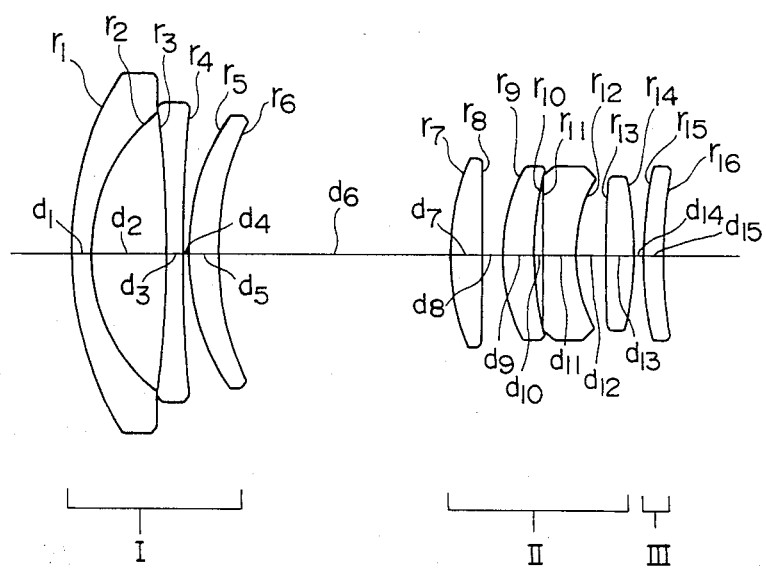
Figure 6:
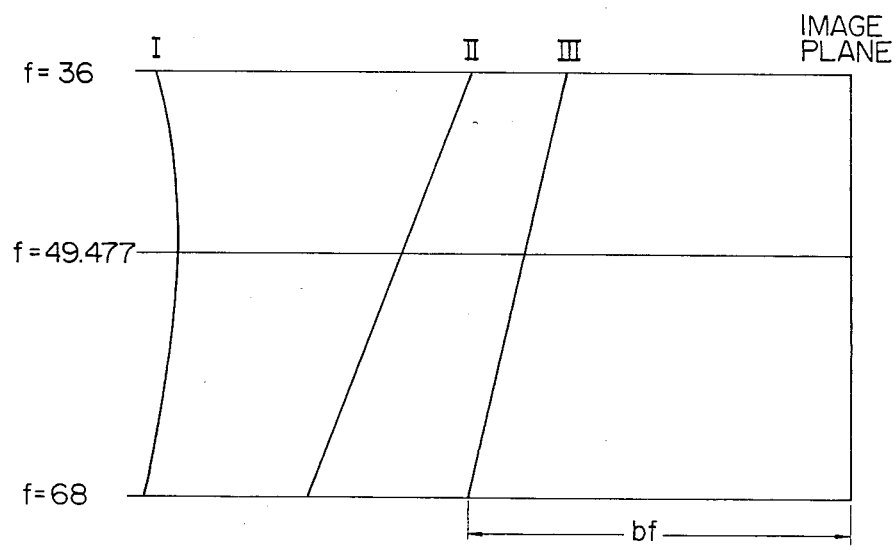

Embodiments of the present invention which fulfill with all the conditions as described above will be given hereinafter. FIGS. 1, 3 and 5 are sectional views showing the constitution of lenses in Embodiments 1, 2 and 3, respectively, and FIGS. 2, 4 and 6 are views showing the relative movement of the lens units in zooming of Embodiments 1, 2 and 3, respectively. In Tables, reference character $r_i$ designates the radius of curvature of the spherical surface; $d_i$, the axial lens thickness or air space; and $n_i$ and $v_i$, the refractive index and Abbe number of a lens material to a d-line.

| Embodiment 1 | | |
|---|---|---|
| $f = 36–68$ | $1:3.4–4.7$ | Field angle $64.6°–35.2°$ |
| $r_1 = 32.744$ | | |
| $d_1 = 1.90$ | $n_1 = 1.69680$ | $v_1 = 55.5$ |
| $r_2 = 16.940$ | | |
| $d_2 = 7.76$ | | |
| $r_3 = -145.408$ | | |
| $d_3 = 1.79$ | $n_2 = 1.69680$ | $v_2 = 55.5$ |
| $r_4 = 145.408$ | | |
| $d_4 = 0.48$ | | |
| $r_5 = 23.032$ | | |
| $d_5 = 2.93$ | $n_3 = 1.76182$ | $v_3 = 26.6$ |
| $r_6 = 30.477$ | | |
| $d_6 =$ variable | | |
| $r_7 = 23.243$ | | |
| $d_7 = 3.05$ | $n_4 = 1.71300$ | $v_4 = 53.9$ |
| $r_8 = \infty$ | | |
| $d_8 = 1.99$ | | |
| $r_9 = 16.693$ | | |
| $d_9 = 2.85$ | $n_5 = 1.71300$ | $v_5 = 53.9$ |
| $r_{10} = 31.549$ | | |
| $d_{10} = 0.962$ | | |
| $r_{11} = -680.000$ | | |
| $d_{11} = 2.25$ | $n_6 = 1.80518$ | $v_6 = 25.5$ |
| $r_{12} = 14.507$ | | |
| $d_{12} = 2.95$ | | |
| $r_{13} = 85.700$ | | |
| $d_{13} = 2.55$ | $n_7 = 1.68893$ | $v_7 = 31.2$ |
| $r_{14} = -38.821$ | | |
| $d_{14} =$ variable | | |
| $r_{15} = 38.993$ | | |
| $d_{15} = 2.00$ | $n_8 = 1.51680$ | $v_8 = 64.2$ |
| $r_{16} = 45.010$ | | |
| f | 36.0 | 49.477 | 68.0 |
| $d_6$ | 21.692 | 9.518 | 0.656 |
| $d_{14}$ | 2.585 | 6.339 | 11.555 |
| bf | 38.92 | 44.55 | 52.38 |
| $f_1 = -50$ | $f_2 = 34.4$ | $f_3 = 507$ | where,
f: composite focal length of the entire system
bf: backfocus of the entire system
$f_1$: focal length of the first unit
$f_2$: focal length of the second unit
$f_3$: focal length of the third unit

| Embodiment 2 | | |
|---|---|---|
| $f = 36–68$ | $1:3.4–4.7$ | Field angle $64.6°–35.2°$ |
| $r_1 = 31.787$ | | |
| $d_1 = 1.89$ | $n_1 = 1.69680$ | $v_1 = 55.5$ |
| $r_2 = 16.701$ | | |
| $d_2 = 7.63$ | | |
| $r_3 = -157.703$ | | |
| $d_3 = 1.79$ | $n_2 = 1.69680$ | $v_2 = 55.5$ |
| $r_4 = 129.564$ | | |
| $d_4 = 0.12$ | | |
| $r_5 = 22.286$ | | |
| $d_5 = 2.93$ | $n_3 = 1.76182$ | $v_3 = 26.6$ |
| $r_6 = 29.384$ | | |
| $d_6 =$ variable | | |
| $r_7 = 22.514$ | | |
| $d_7 = 2.93$ | $n_4 = 1.71300$ | $v_4 = 53.9$ |
| $r_8 = -2304.960$ | | |
| $d_8 = 1.91$ | | |
| $r_9 = 16.038$ | | |
| $d_9 = 2.70$ | $n_5 = 1.71300$ | $v_5 = 53.9$ |
| $r_{10} = 29.888$ | | |
| $d_{10} = 0.99$ | | |
| $r_{11} = -931.298$ | | |
| $d_{11} = 1.92$ | $n_6 = 1.80518$ | $v_6 = 25.5$ |
| $r_{12} = 14.017$ | | |
| $d_{12} = 3.20$ | | |
| $r_{13} = 72.130$ | | |
| $d_{13} = 2.43$ | $n_7 = 1.68893$ | $v_7 = 31.2$ |
| $r_{14} = -39.472$ | | |
| $d_{14} =$ variable | | |
| $r_{15} = 157.016$ | | |
| $d_{15} = 2.23$ | $n_8 = 1.51680$ | $v_8 = 64.2$ |

-continued

| Embodiment 2 |
| --- |
| f = 36–68  1:3.4–4.7  Field angle 64.6°–35.2° |

| $r_{16}$ = 184.245 | | | |
| --- | --- | --- | --- |
| f | 36.0 | 49.477 | 68.0 |
| $d_6$ | 21.883 | 9.627 | 0.709 |
| $d_{14}$ | 2.316 | 6.795 | 12.966 |
| bf | 38.89 | 43.37 | 49.54 |
| $f_1 = -50$ | | $f_2 = 33$ | $f_3 = 2000$ | where,
f: composite focal length of the entire system
bf: backfocus of the entire system
$f_1$: focal length of the first unit
$f_2$: focal length of the second unit
$f_3$: focal length of the third unit

| Embodiment 3 |
| --- |
| f = 36–68  1:3.4–4.7  Field angle 64.6°–35.4° |

| $r_1$ = 32.574 | | |
| --- | --- | --- |
| $d_1$ = 1.88 | $n_1$ = 1.69680 | $\nu_1$ = 55.5 |
| $r_2$ = 17.315 | | |
| $d_2$ = 7.50 | | |
| $r_3$ = −142.417 | | |
| $d_3$ = 1.84 | $n_2$ = 1.69680 | $\nu_2$ = 55.5 |
| $r_4$ = 145.938 | | |
| $d_4$ = 0.46 | | |
| $r_5$ = 23.437 | | |
| $d_5$ = 2.97 | $n_3$ = 1.76182 | $\nu_3$ = 26.6 |
| $r_6$ = 31.219 | | |
| $d_6$ = variable | | |
| $r_7$ = 24.748 | | |
| $d_7$ = 2.99 | $n_4$ = 1.71300 | $\nu_4$ = 53.9 |
| $r_8$ = −712.429 | | |
| $d_8$ = 1.98 | | |
| $r_9$ = 17.213 | | |
| $d_9$ = 3.10 | $n_5$ = 1.71300 | $\nu_5$ = 53.9 |
| $r_{10}$ = 32.004 | | |
| $d_{10}$ = 0.97 | | |
| $r_{11}$ = −379.221 | | |
| $d_{11}$ = 3.00 | $n_6$ = 1.80518 | $\nu_6$ = 25.5 |
| $r_{12}$ = 15.163 | | |
| $d_{12}$ = 3.06 | | |
| $r_{13}$ = 156.379 | | |
| $d_{13}$ = 2.67 | $n_7$ = 1.68893 | $\nu_7$ = 31.2 |
| $r_{14}$ = −36.529 | | |
| $d_{14}$ = variable | | |
| $r_{15}$ = 36.620 | | |
| $d_{15}$ = 2.09 | $n_8$ = 1.51680 | $\nu_8$ = 64.2 |
| $r_{16}$ = 52.100 | | |
| f | 36.0 | 49.477 | 68.0 |
| $d_6$ | 22.682 | 9.949 | 0.660 |
| $d_{14}$ | 0.989 | 4.848 | 10.288 |
| bf | 39.35 | 45.14 | 53.30 |
| $f_1 = -52.5$ | | $f_2 = 36.6$ | $f_3 = 228$ | where,
f: composite focal length of the entire system
bf: backfocus of the entire system
$f_1$: focal length of the first unit
$f_2$: focal length of the second unit
$f_3$: focal length of the third unit The length from the front surface of the lens to the image surface in the intermediate focal length (f=49.477) at which the overall length of the lens is close to the minimum, to represent a degree of achieving the miniaturization of the embodiments of the lens according to the present invention, is extremely small, such as 1.38 times in Embodiment 1,
1.36 times in Embodiment 2, and
1.39 times in Embodiment 3
of the longest focal length (f=68).

Figure 8A:
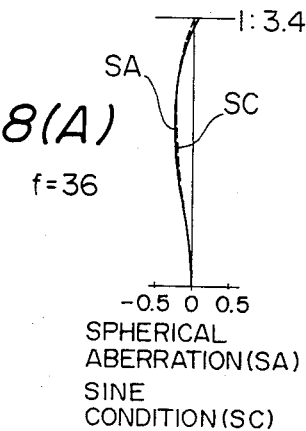
Figure 8B:
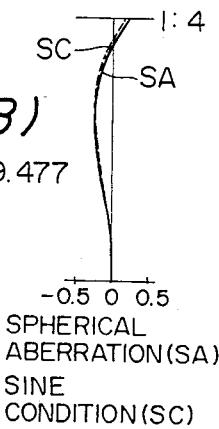
Figure 8C:
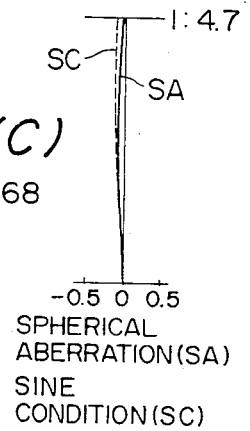

The aberration curves in Embodiments 1, 2, and 3 are shown in FIGS. 7, 8 and 9, respectively.

In FIGS. 7 to 9, (A) is for the shortest focal length f=36, (B) for the intermediate focal length f=49.477, and (C) for the longest focal length f=68.

In the drawings, SA designates the spherical aberration; SC, the sinusoidal condition; S, the sagital focal line; and M, the tangential focal line.

As will be apparent from FIGS. 7 to 9, various aberrations are well corrected in the whole zone of variable power despite the fact that in these embodiments, the minimum length from the front surface of the lens to the image surface is very small, less than 1.39 times of the longest focal length.

What is claimed is:

1. A small zoom lens composed, in order from an object side, of a first unit having a negative refracting power, a second unit having a positive refracting power and a third unit having a positive refracting power, in which in zooming from a short focal length side to a long focal length side, said first unit is first moved toward an image on an optical axis, and halfway moved conversely toward the object to correct a variation in focal position, said second unit is moved toward the object on the optical axis to effect a variable power, and said third unit is moved toward the object with an amount different from that of the second unit to effect a variable power, the zoom lens being fulfilled with the following various conditions:

(1) $0.6\,fT < |f_1| < 0.85fT$
   (2) $d_{2.3}w < d_{2.3}T$
   (3) $bfw < bfT$
   (4) $0.01 < f_2/f_3 < 0.2\ (f_2 > 0,\ f_3 > 0)$
   (5) $r_3.R > 0$ where,
   $f_1$: focal length of the first unit
   $f_2$: focal length of the second unit
   $f_3$: focal length of the third unit
   fT: composite focal length of the entire system in the longest focal length
   $d_{2.3}w$: lens space between the second and third units in the shortest focal length
   $d_{2.3}T$: lens space between the second and third units in the longest focal length
   bfw: backfocus of the entire system in the shortest focal length
   bfT: backfocus of the entire system in the longest focal length
   $r_3.R$: radius of curvature of the spherical surface on the image side of the third unit lens.

2. A small zoom lens as set forth in claim 1, wherein said first unit is composed, in order from the object, a meniscus negative lens with its convex surface being faced to the object, a double-concave negative lens and a meniscus positive lens with its convex surface being faced to the object, said second unit is composed of at least three positive lenses and a single negative lens, and said third unit is composed of a meniscus positive single lens with its convex surface being faced to the object.

* * * * *